United States Patent [19]

Ohtaki et al.

[11] Patent Number: 4,590,61[?]

[45] Date of Patent: May 20, 198[?]

[54] MULTIPATH DISTORTION REDUCING CIRCUIT

[75] Inventors: Kiyoshi Ohtaki; Kohji Ishida, both of Tokyo, Japan

[73] Assignee: Pioneer Electronic Corporation, Tokyo, Japan

[21] Appl. No.: 622,336

[22] Filed: Jun. 19, 1984

[30] Foreign Application Priority Data

Jul. 6, 1983 [JP] Japan ................ 58-122505

[51] Int. Cl.[4] .............................. H04B 1/10
[52] U.S. Cl. .................. 455/304; 455/295; 455/206; 455/65
[58] Field of Search ................ 455/303-306, 455/295, 296, 312, 65, 63, 205, 206

[56] References Cited

U.S. PATENT DOCUMENTS

| 3,176,231 | 3/1965 | Vallese et al. | 455/65 |
| 4,166,251 | 8/1979 | Ishigaki et al. | 455/206 |
| 4,266,296 | 5/1981 | Ishigaki | 455/305 |

FOREIGN PATENT DOCUMENTS 57-125542  8/1982  Japan .................. 455/20[?]

OTHER PUBLICATIONS

Ishigaki et al.; "Electronic Reduction of FM Distortion Caused by Multipath Transmission"; *I.E.E.E.-Trans. on Consumer Electr.;* vol. CE-26, Feb. 1980, pp. 28-35.

*Primary Examiner*—Marc E. Bookbinder
*Assistant Examiner*—Andrew J. Telesz, Jr.
*Attorney, Agent, or Firm*—Sughrue, Mion, Zinn, Macpeak & Seas

[57] ABSTRACT

A multipath distortion reducing circuit particularly adapted for use with stereophonic receiving circuits in which the amount of mixing between right and left channels is reduced. In accordance with the invention the envelope of the received FM signal is AM detected and the envelope detected circuit is multiplied by the FM detected signal differentiated to provide a distortion cancelling signal. The distortion cancelling signal is summed with the detected FM signal to provide an output having a reduced multipath distortion component.

4 Claims, 11 Drawing Figures

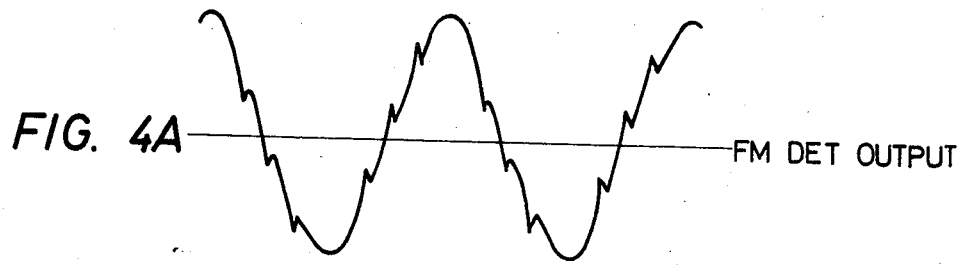
FIG. 4A — FM DET OUTPUT
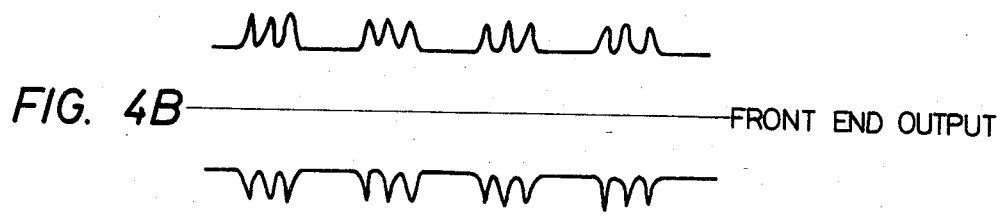
FIG. 4B — FRONT END OUTPUT
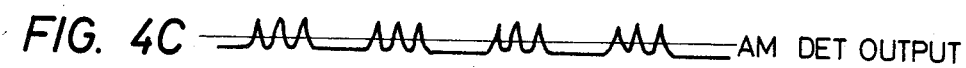
FIG. 4C — AM DET OUTPUT
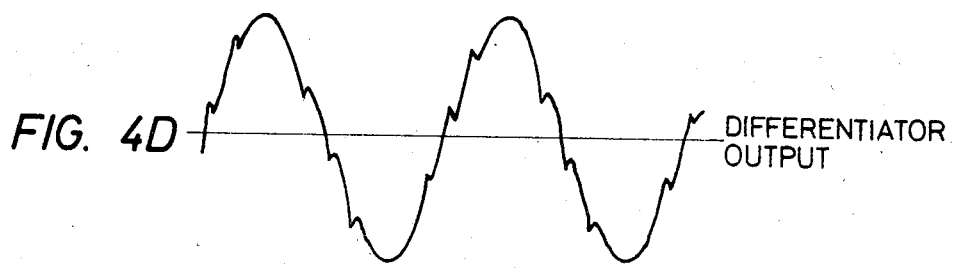
FIG. 4D — DIFFERENTIATOR OUTPUT
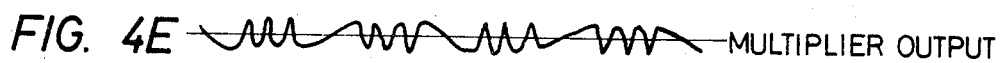
FIG. 4E — MULTIPLIER OUTPUT

MULTIPATH DISTORTION REDUCING CIRCUIT

BACKGROUND OF THE INVENTION

The present invention relates to a circuit for reducing the amount of multipath distortion in an FM tuner.

An example of a conventional multipath distortion reducing circuit of this type is shown in FIG. 1. In FIG. 1, the output terminal of a front end 1 is connected to a 10.7 MHz bandpass filter (BPF) 2, the output terminal of which is connected to the input terminal of an FM detector 3. The output terminal of the FM detector 3 is connected to the input terminal of a stereo demodulator 4. The latter provides a left channel output and a right channel output respectively at a left channel output terminal 5 and a right channel output terminal 6. A series circuit of a capacitor C and a switch SW is connected between the output terminals 5 and 6.

When multipath distortion occurs and accordingly the noise level increases to make it difficult to hear the reproduced signal, the switch SW connected between the left channel output terminal 5 and the right channel output terminal 6 is turned on. In this case, high-frequency noise components contained in the right and left channel outputs, which are offensive to the ear and which are opposite in phase to one another, are cancelled out, being shorted by the capacitor C. Thus, the perceived noise level is reduced. However, the circuit is disadvantageous in that, the higher the frequency of the cancelled-out signal components, the larger the ratio of mixing of right and left channels, and the lesser the degree of separation between the two channels.

SUMMARY OF THE INVENTION

An object of this invention is to eliminate the above-described difficulties accompanying a conventional multipath distortion decreasing circuit.

In accordance with the above and other objects, the invention provides a circuit in which the envelope of the IF signal is detected to form a distortion cancelling signal which is applied to reduce the amount of multipath distortion.

BRIEF DESCRIPTION OF THE DRAWINGS

FIGS. 4A-4E are diagrams showing waveforms at various circuit points in the circuit of FIG. 2;

DESCRIPTION OF THE PREFERRED EMBODIMENTS

A preferred embodiment of the invention will be described with reference to the drawings.

Figure 2:
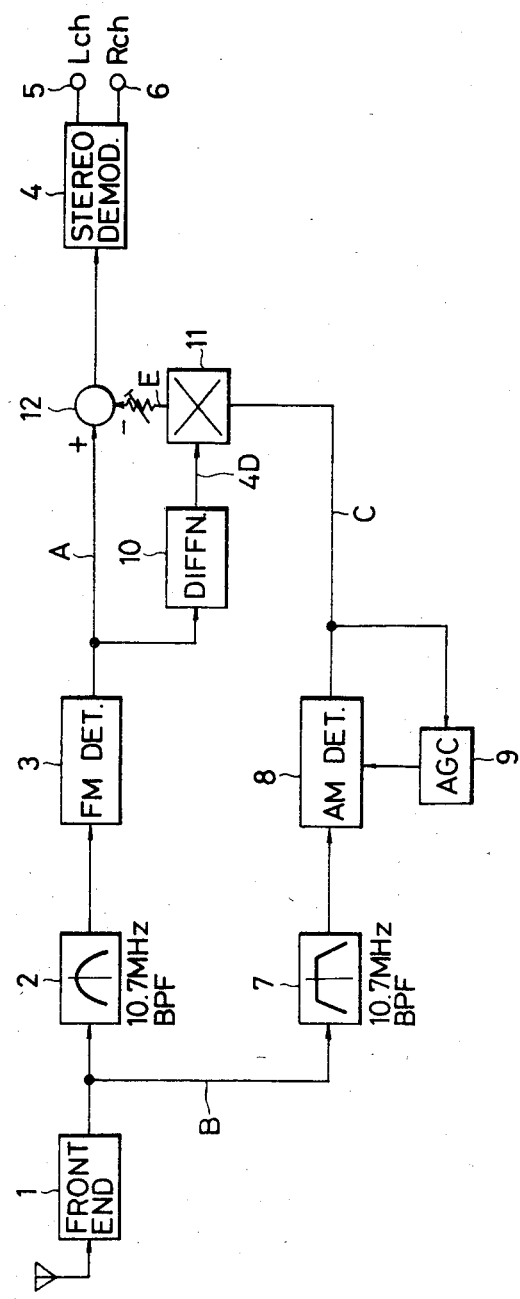
FIG. 2 is a block diagram showing an example of a multipath distortion reducing circuit according to the invention.

As shown in FIG. 2, in a multipath distortion reducing circuit of the invention the output terminal of a front end is connected to a first 10.7 MHz BPF 2 and a second 10.7 MHz BPF 7. The output terminal of the first 10.7 MHz BPF 2 is connected to an FM detector 3, the output terminal of which is connected to a differentiator 10 and one input terminal of an adder 12. The output terminal of the second 10.7 MHz BPF is connected to an input terminal of an AM detector 8. The output of the AM detector 8 is utilized to apply automatic gain control (AGC) to the AM detector 8 with the aid of an AGC circuit 9.

The output terminal of the differentiator 10 is connected to one input terminal of a multiplier 11, the other input terminal of which is connected to the output terminal of the AM detector 8. The output terminal of the multiplier 11 is connected to the other input terminal of the adder 12, the output terminal of which is connected to a stereo demodulator 4. The stereo demodulator 4 provides a left channel output and a right channel output, respectively, at a left channel output channel 5 and a right channel output terminal 6.

The operation of the above-described circuit will now be described.

The case will be considered where one reflected signal is present in the received FM signal and the FM signal is in the monaural mode. In this case, the output of the FM detector 3 is as shown in FIG. 4A and an IF signal outputted by the front end 1 is as shown in FIG. 4B. It can be understood that a certain relation exists between the signals shown in FIGS. 4A and 4B. In accordance with the invention, this relation is utilized to reduce the amount of multipath distortion.

The envelope of the output of the front end 1 (shown in FIG. 4B) is detected to form a distortion cancelling signal. The multipath distortion is decreased by subtracting the distortion cancelling signal thus formed from the FM detection output.

In more detail, first the output of the front end 1 is applied to the second 10.7 MHz BPF, which has a flat in-band amplitude characteristic, to remove unwanted interference components therefrom. The output thus treated is applied to the AM detector 8 under automatic gain control to detect the envelope of the IF signal. The envelope signal, as shown in FIG. 4C, has a constant amplitude irrespective of the presence or content of the IF signal due to the automatic gain control effect applied thereto.

As is apparent from FIG. 4A, the distortion appearing in the FM detection output is inverted every half period of the fundamental wave. Therefore, a cancelling signal can be obtained by inverting the AM detection output 8 (FIG. 4C) every half period.

Figure 1:
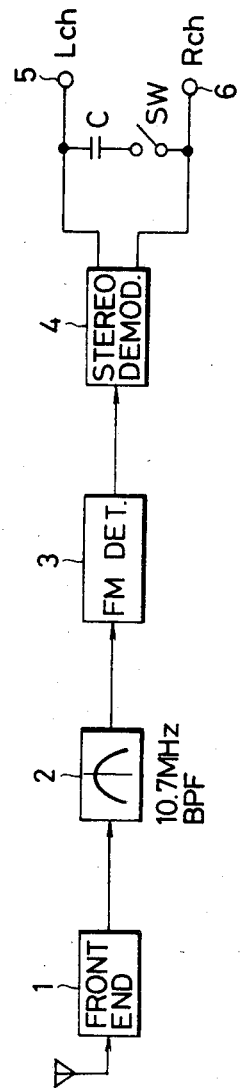
FIG. 1 is a block diagram showing an example of a conventional multipath distortion reducing circuit.
Figure 3:
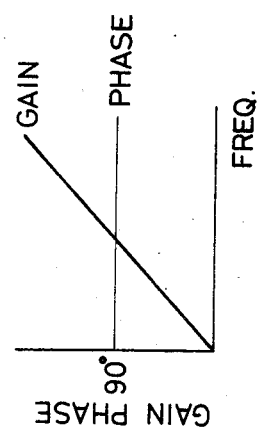
FIG. 3 is a graphical representation indicating the characteristic of a differentiator in FIG. 2.

The amount of distortion generally increases with the modulation frequency. Therefore, it is necessary to increase the amplitude of the cancelling signal as the modulation frequency increases. For this purpose, the differentiator 10 and the multiplier 11 are provided as shown in FIG. 2. The differentiator 10 has a gain-phase characteristic as shown in FIG. 3. The output of the FM detector 3 is shifted by 90° in phase when applied to the differentiator 10 to convert it to a waveform as shown in FIG. 4D. This signal and the signal shown in FIG. 4C are subjected to multiplication by the multiplier 11 to obtain the cancelling signal shown in FIG. 4E. The cancelling signal is applied to the adder 12 where it is subtracted from the detection output shown in FIG. 4A. As a result, a signal in which the multipath distortion has been substantially reduced is provided at the output terminal of the adder 12.

The distortion reducing effect will be described mathematically.

If a single reflection is involved in the multipath-distorted signal, the distortion component can be expressed as follows:

$$d = \frac{2mfp \cdot \sin p\tau/2 \cdot \sin p(t - \tau/2)}{1 + \frac{1/x + \cos[\omega_0\tau + 2mf \cdot \sin p\tau/2 \cdot \cos p(t - \tau/2)]}{x + \cos[\omega_0\tau + 2mf \cdot \sin p\tau/2 \cdot \cos p(t - \tau/2)]}}$$

where x=ratio in magnitude of direct wave to reflected wave, $\tau$=delay time, m=modulation factor, f=75 KHz, $\omega_0$=carrier frequency, and p=modulation frequency.

Figure 5:
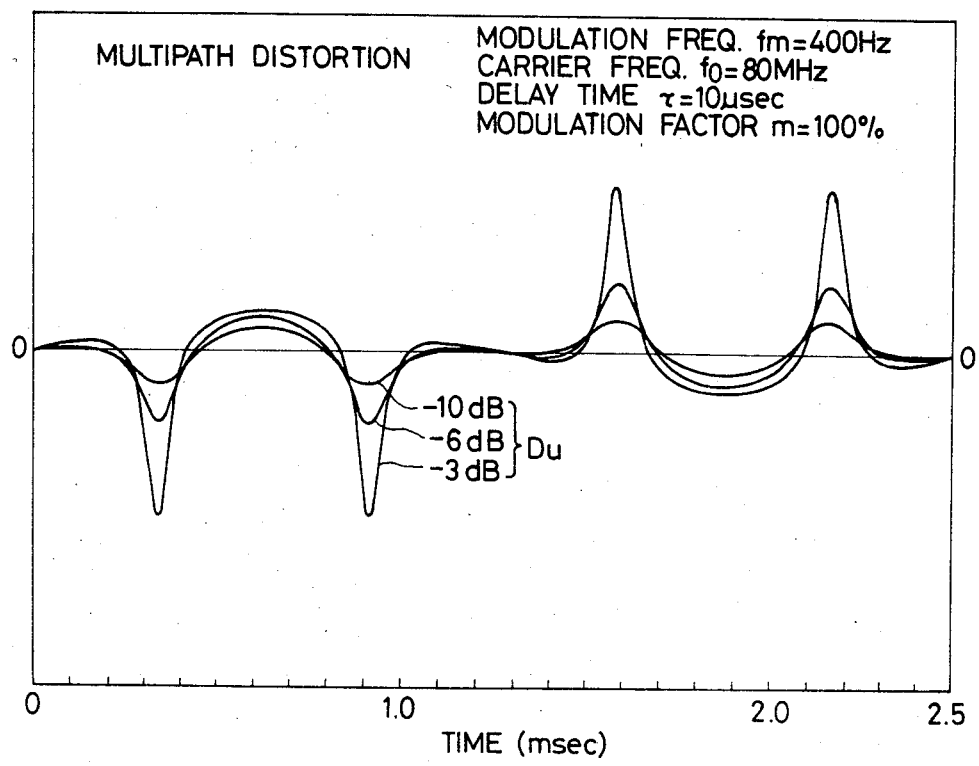
FIG. 5 is a graphical representation showing a multipath distortion characteristic obtained by calculation.

FIG. 5 is a graphical representation showing the multipath distortion characteristic described by the above expression in which the horizontal axis represents time and the vertical axis represents the magnitude of the multipath distortion.

When the IF signal envelope outputted by the AM detector 8 is multiplied by the differential FM detection output outputted by the differentiator 10 as shown in FIG. 2, the above-described expression is converted as follows:

$$d' = \sqrt{1 + x + 2x \cdot \cos\left[\omega_0\tau + 2mf \cdot \sin\frac{p\tau}{2} \cdot \cos p\left(t - \frac{\tau}{2}\right)\right]} \cdot p \cdot \cos pt$$

Figure 6:
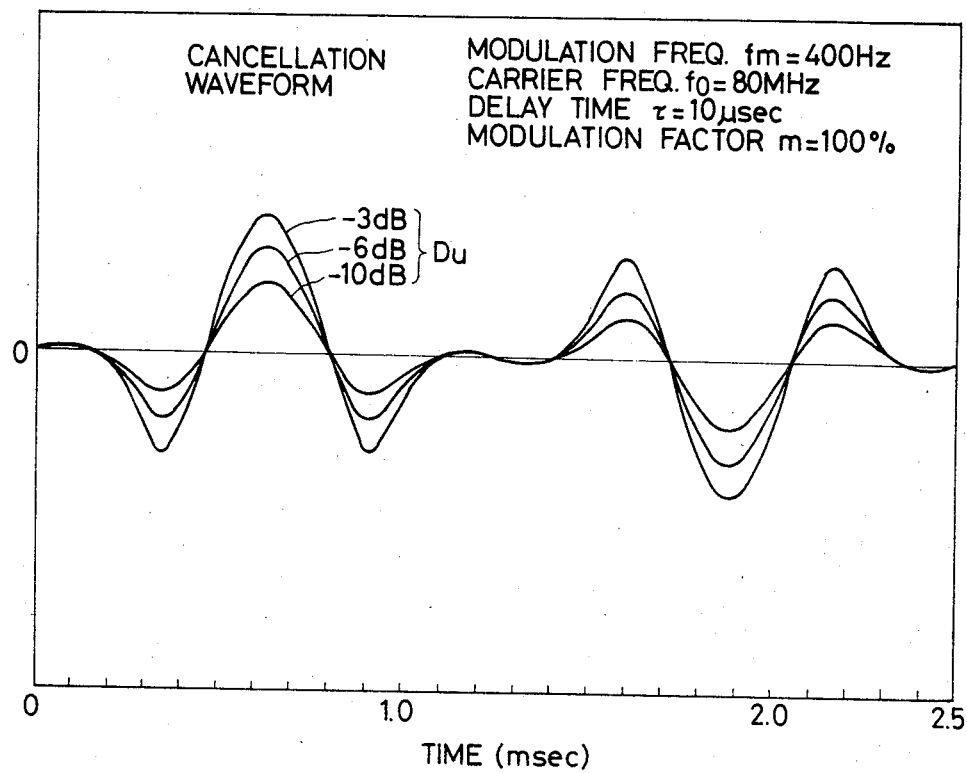
FIG. 6 is a graphical representation showing a characteristic obtained by multiplication of the outputs of an AM detector and of the differentiator shown in FIG. 2.

A characteristic plotted according to this expression is as shown in FIG. 6. As is apparent from a comparison of FIGS. 5 and 6, the characteristic of FIG. 6 is similar to that of FIG. 5. Thus, the reduction in the amount of multipath distortion brought about with the use of the invention has been proven.

While the invention has been described with reference to a monaural signal broadcast, the technical concept of the invention is similarly applicable to the case of a stereo signal broadcast.

Figure 7:
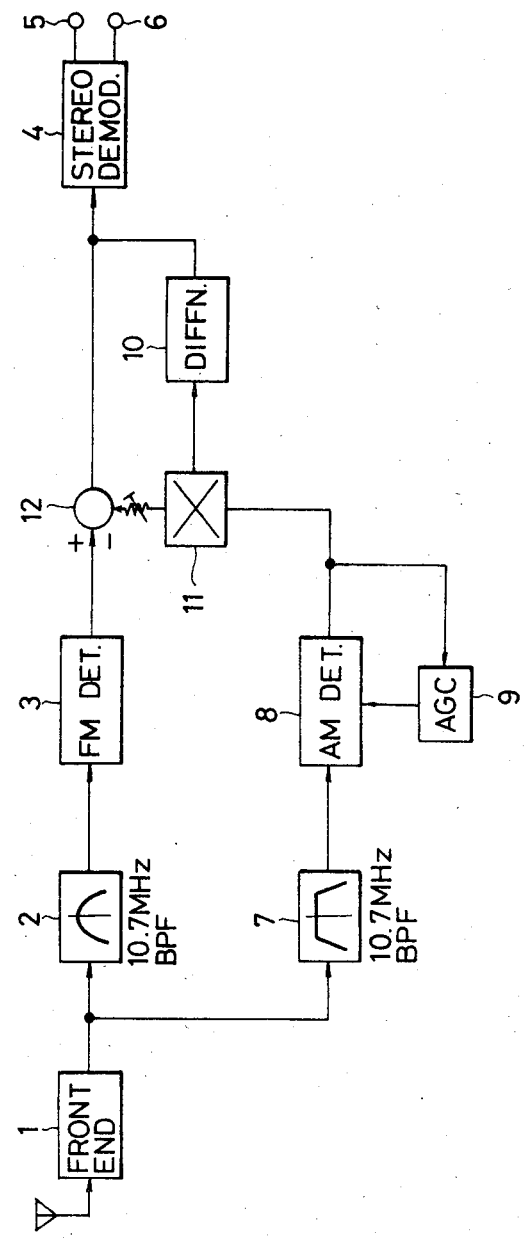
FIG. 7 is a block diagram showing another example of a circuit according to the invention.

In the above-described embodiment, only the multipath distortion decreasing circuit is shown. However, a small amount of high blending may be effected by connecting a small-value capacitor between the right channel output terminal and the left channel output terminal. Furthermore, in the above-described embodiment, the differentiator 10 receives the output of the FM detector 3. However, it may receive the output of the adder 12 as shown in FIG. 7.

As is apparent from the above description, the mulipath distortion reducing circuit according to the invention is so designed that a multipath distortion cancelling signal is formed by detecting the envelope of the IF signal, thereby to decrease the multipath distortion. Therefore, with the circuit of the invention, the amount of multipath distortion can be decreased without lowering the degree of separation.

We claim:

1. A multipath distortion reducing circuit comprising:
means for receiving an FM signal;
AM detection means for detecting an envelope of said FM signal;
AGC circuit means coupled to said AM detecting means for causing an output of said AM detecting means to be constant, irrespective of a magnitude of said FM signal;
FM detecting means for FM detecting said FM signal;
means for differentiating an output of said FM detecting means for shifting said output of said FM detecting means by 90° in phase and imparting a frequency characteristic to said output of said FM detecting means such that a level of said output of said FM detecting means increases as the frequency thereof increases;
multiplier means having inputs receiving an output of said differentiating means and said output of said AM detecting means for forming a cancelling signal by multiplying said output of said differentiating means and said output of said AM detecting means; and
adding means for adding said cancelling signal to said output of said FM detecting means to provide an output signal haveing reduced multipath distortion.

2. The multipath distortion reducing circuit of claim 1, further comprising first bandpass filtering means coupled between said receiving means and an input of said FM detecting means and second bandpass filtering means coupled between said output of said receiving means and an input of said AM detecting means.

3. A multipath distortion reducing circuit comprising:
means for receiving an FM signal;
AM detection means for detecting an envelope of said FM signal;
AGC circuit means coupled to said AM detecting means for causing an output of said AM detecting means to be constant, irrespective of a magnitude of said FM signal;
FM detecting means for FM detecting said FM signal;
multiplier means having a first input coupled to said output of said AM detecting means;
adder means having a first input coupled to an output of said FM detecting means and a second input coupled to an output of said multiplying means for adding a cancelling signal provided at said output of said multiplying means to said output of said FM detecting means; and
differentiating means having an input coupled to said output of said adder and an output coupled to a second input of said multiplier for shifting said output of said adder by 90° in phase and imparting a frequency characteristic to said output of said adder means such that a level of said output of said adder means increases as the frequency thereof increases.

4. The multipath distortion reducing circuit of claim 3, further comprising first bandpass filtering means coupled between sid receiving means and an input of said FM detecting means and second bandpass filtering means coupled between said output of said receiving means and an input of said AM detecting means.

* * * * *